H. F. MARANVILLE.
AIR BAG FOR PNEUMATIC TIRE MANUFACTURE.
APPLICATION FILED DEC. 11, 1919.
1,390,303.
Patented Sept. 13, 1921.
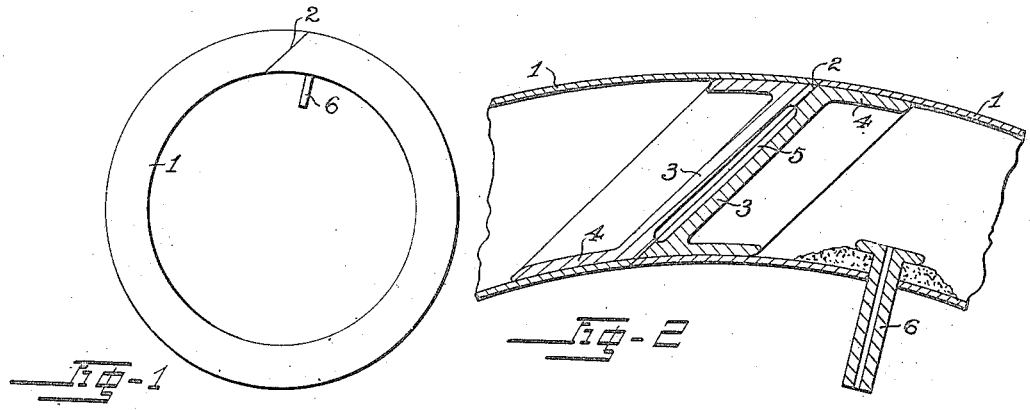
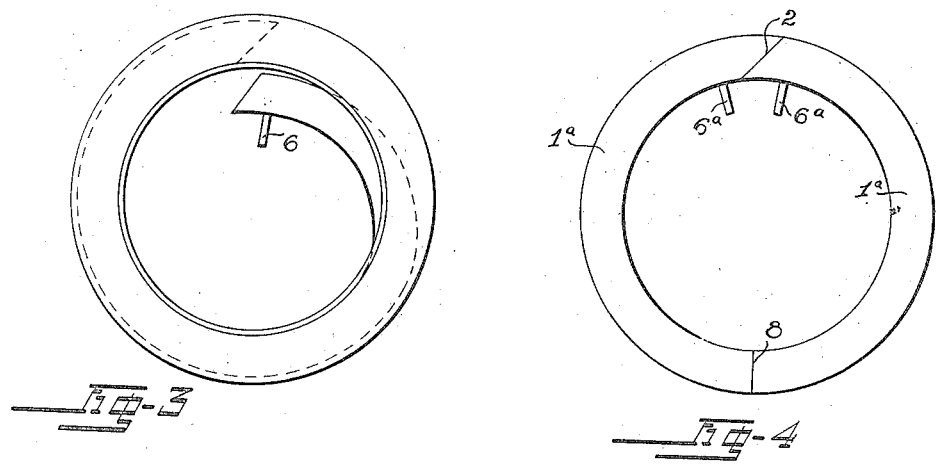
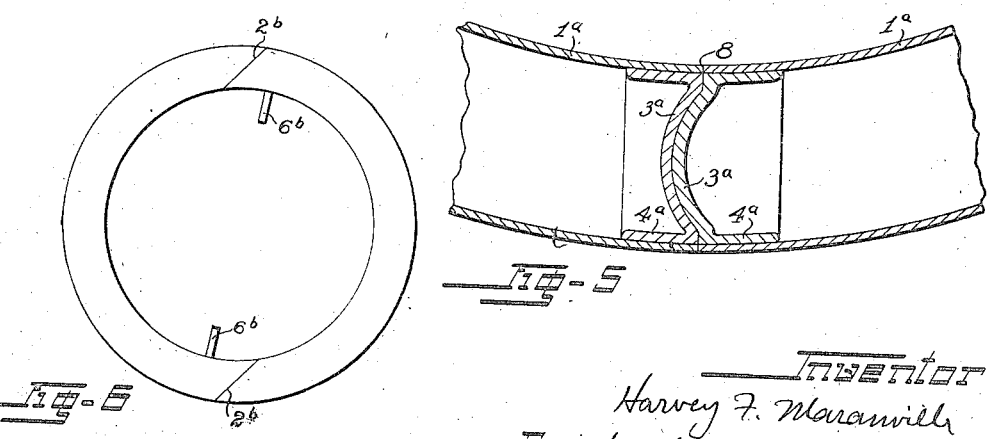

UNITED STATES PATENT OFFICE.

HARVEY F. MARANVILLE, OF AKRON, OHIO, ASSIGNOR TO THE MILLER RUBBER COMPANY, OF AKRON, OHIO, A CORPORATION OF OHIO.

AIR-BAG FOR PNEUMATIC-TIRE MANUFACTURE.

1,390,303.

Specification of Letters Patent. Patented Sept. 13, 1921.

Application filed December 11, 1919. Serial No. 344,132.

*To all whom it may concern:*

Be it known that I, HARVEY F. MARANVILLE, a citizen of the United States, residing at Akron, in the county of Summit and State of Ohio, have invented a certain new and useful Improvement in Air-Bags for Pneumatic-Tire Manufacture, of which the following is a full, clear, and exact description, reference being had to the accompanying drawings.

This invention relates to the inflatable tubes or mandrels employed for the curing of certain kinds of pneumatic tires and called in the trade "air bags." Certain kinds of pneumatic tires are ordinarily cured or vulcanized in metal molds, the interior of the shoe or casing being filled with a somewhat expansible bag which is filled with air at a very high pressure so as to force the rubber into close contact with the mold walls and produce a fine grained uniform structure which would be impossible in the absence of pressure. In other cases the tire instead of being inclosed in a metal mold is wrapped with cloth or light fabric, but is similarly filled with an air bag. These air bags have always heretofore been made in the form of an endless ring much like an inner tube, excepting with walls of greater thickness in order to withstand the very great pressure and frequently with fibrous or fabric reinforcements for the same purpose, and in order to remove the same from the cured tire or casing it has been necessary to employ great force, accompanied by much folding and bending. This action coupled with the comparatively great thickness and stiffness of the air bags, which stiffness is rapidly increased as a consequence of the repeated heating to which they are subjected, occasions their rapid destruction with the result that such a device will not ordinarily serve for the curing of more than about eight casings after which it must be replaced at great expense.

The objects of the present invention are the provision of a new and improved construction of air bag which shall greatly facilitate its insertion into and removal from the casing and thereby tend to prolong its life; the provision of an air bag severed in one or more places to facilitate its manipulation and having peculiar provisions for maintaining the severed ends in alinement during use and for facilitating the removal and replacement; while further objects and advantages of the invention will become apparent as the description proceeds.

In the drawings accompanying and forming a part of this application I have shown certain preferred embodiments of my said invention although it will be understood that the said drawings are illustrative only and do not restrict me to the specific physical forms therein disclosed. In these drawings, Figure 1 illustrates a complete air bag made in accordance with my invention; Fig. 2 is a sectional view adjacent to the joint therein; Fig. 3 illustrates the step of removing the same from or applying the same to a tire-casing; Fig. 4 illustrates a modified air bag severed in two places; Fig. 5 is a sectional view through a modified end joint such as is shown at the bottom side of Fig. 4; and Fig. 6 illustrates yet another modification of my invention.

Describing the parts by reference characters, 1 represents the body of the air bag which is made of flexible, somewhat elastic, material, such as a suitable rubber composition, with or without cord, thread, or fabric reinforcement. My invention is independent of the exact cross-sectional shape of the same or the composition or reinforcement, all of which features vary considerably with different manufacturers and none of which are important in this connection. According to the embodiment of my invention shown in Figs. 1, 2 and 3, this tube is severed at a single point 2 upon a plane which is parallel to the axis and oblique to the radius of the tube, which is preferably approximately of torus shape. Secured in the end of each section is a closure, also of flexible material, consisting of a web 3 parallel to the plane of severance and a flange 4 hermetically attached to the wall of the section. The adjacent faces of the webs 3—3 are preferably recessed as shown at 5 so that when the air bag is inflated the webs will be pressed toward each other and held in close frictional contact but when deflated will release each other allowing the ends to be readily displaced as shown in Fig. 3. An inflation nipple 6 is provided, preferably close to that end of the section which underlies the end of the other section, since this part is the first to be removed and the last to be inserted.

In the embodiment shown in Fig. 4 the air bag is made in two sections indicated at 1ª—1ª, one of the joints being upon an oblique angle as shown at 2ª and the other being parallel to the radius as shown at 8.

In Fig. 5 I have shown a section of a modified end closure adapted particularly for use in connection with such a square cut end, the same comprising webs 3ª—3ª of flexible material, similarly having securing flanges 4ª—4ª, but being themselves of sufficient fullness to tend to assume a bulging shape, which tendency is always enhanced by different pressures upon opposite sides thereof. When plural sections are employed, plural inlet nipples must be used as shown at 6ª—6ª in Fig. 4, and the segments independently inflated.

In Fig. 6 I have shown a two-segment air bag in which both ends are inclined as shown at 2ᵇ—2ᵇ, and the nipples are located symmetrically as shown at 6ᵇ—6ᵇ. It will be understood that many other physical modifications can be employed and that my invention is limited only by the claims hereto annexed.

Having thus described my invention, what I claim is:—

1. A flexible expansible mandrel or air bag for pneumatic tire manufacture, of approximate annular form and severed at at least one point.

2. A flexible expansible mandrel or air bag for pneumatic tire manufacture, of approximate annular form and severed upon an oblique angle at least at one point.

3. A flexible expansible mandrel or air bag for pneumatic tire manufacture, of approximate annular form and severed at least at one point there being a closure inside each severed end adapted to engage the similar closure of the end submitted thereto.

4. A flexible expansible mandrel or air bag for pneumatic tire manufacture, of approximate annular form and severed at least at one point and a flexible elastic web bridging each end of each section and constituting a closure therefor and adapted upon the inflation of said air bag to interlock with the closure adjacent thereto.

5. The combination with a pneumatic tire casing, of an air bag within said casing made of flexible elastic material and conforming in shape to the casing interior, said air bag being severed at least at one point upon a plane which is oblique to the radius and substantially parallel to the axis of said casing.

6. A sectional expansible air bag for pneumatic tire manufacture.

7. An expansible mandrel or air bag for pneumatic tire manufacture of approximate annual form made of flexible material and severed at least at one point, and a flexible closure hermetically sealed to the bag walls at each side of the point of severance and adapted when inflated to engage the opposite closure.

8. A sectional expansible air bag for pneumatic tube manufacture and a separate inflation nipple for each segment.

9. The combination with a pneumatic tire casing, of an air bag within said casing made of flexible elastic material and conforming in shape to the casing interior, said air bag being severed at least at one point upon a plane which is oblique to the radius and substantially parallel to the axis of said casing, each end of said air bag having a flexible closure therein, and each segment having an inflating nipple.

In testimony whereof, I hereunto affix my signature.

HARVEY F. MARANVILLE.